United States Patent
Momoki et al.

(10) Patent No.: US 9,305,213 B2
(45) Date of Patent: Apr. 5, 2016

(54) IMAGE LAYOUT GENERATING APPARATUS, IMAGE PRODUCT CREATION SYSTEM, IMAGE LAYOUT GENERATING METHOD, AND RECORDING MEDIUM FOR IMAGE LAYOUT GENERATING PROGRAM

(71) Applicant: FUJIFILM Corporation, Tokyo (JP)

(72) Inventors: Yohei Momoki, Tokyo (JP); Kei Yamaji, Tokyo (JP); Hidetoshi Takanaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/670,437

(22) Filed: Mar. 27, 2015

(65) Prior Publication Data
US 2015/0278595 A1    Oct. 1, 2015

(30) Foreign Application Priority Data
Mar. 27, 2014   (JP) ................. 2014-066442

(51) Int. Cl.
| | |
|---|---|
| G06K 9/68 | (2006.01) |
| G06K 9/00 | (2006.01) |
| G06K 9/62 | (2006.01) |
| G06K 9/72 | (2006.01) |
| G06T 11/60 | (2006.01) |
| G06F 17/30 | (2006.01) |

(52) U.S. Cl.
CPC ........ *G06K 9/00456* (2013.01); *G06F 17/3028* (2013.01); *G06K 9/00677* (2013.01); *G06K 9/00684* (2013.01); *G06K 9/6267* (2013.01); *G06K 9/72* (2013.01); *G06T 11/60* (2013.01)

(58) Field of Classification Search
CPC ............ G06K 9/0014; G06K 9/00684; G06K 9/00671; G06F 17/30256; G06T 2207/20021; G06T 2200/24; G06T 2207/10016

USPC .......................................................... 382/128
See application file for complete search history.

(56) References Cited

U.S. PATENT DOCUMENTS

| | | | |
|---|---|---|---|
| 2005/0071781 A1 | 3/2005 | Atkins | |
| 2005/0071783 A1 | 3/2005 | Atkins | |
| 2012/0076427 A1* | 3/2012 | Hibino | ............... G06K 9/00671 382/218 |
| 2013/0239003 A1* | 9/2013 | Usenko | ................. G06F 3/0488 715/733 |

FOREIGN PATENT DOCUMENTS

| | | |
|---|---|---|
| JP | 2005-110280 | 4/2005 |
| JP | 2010-262678 | 11/2010 |

\* cited by examiner

*Primary Examiner* — Stephen R Koziol
*Assistant Examiner* — Shaghayegh Azima
(74) *Attorney, Agent, or Firm* — Young & Thompson

(57) ABSTRACT

An image layout generating apparatus includes: a first image arranging unit for extracting a first piece of image data from a plurality of image data, and arrange a first image; an image data extracting unit for extracting a new piece of image data; an arranged image selecting unit configured to calculate an inter-image distance between the new piece of image data and image data of each arranged image, and select one of the arranged images; a second image arranging unit configured to arrange a new image to be above, below, left, or right of the selected arranged image by adjusting a size while maintaining an aspect ratio of the new image; and a size adjusting unit configured to adjust the sizes while maintaining the aspect ratios of all the arranged images so as to configure one set of images in which all of the arranged images overall form a rectangle.

16 Claims, 11 Drawing Sheets

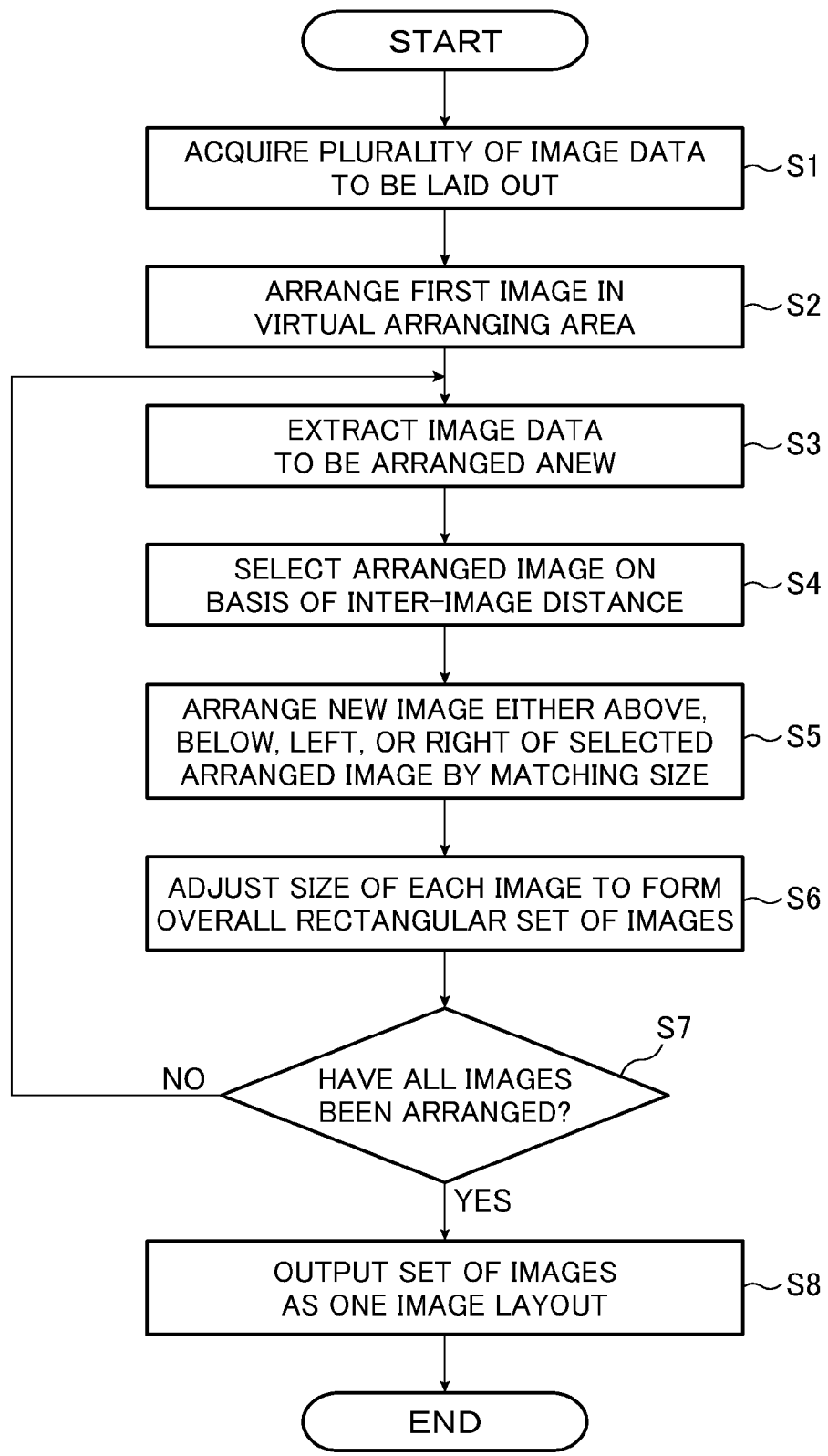

FIG.3A
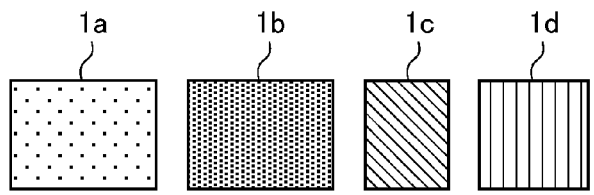
FIG.3B
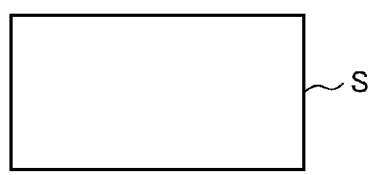
FIG.4A (IMAGE ARRANGEMENT) (LOGICAL STRUCTURE)
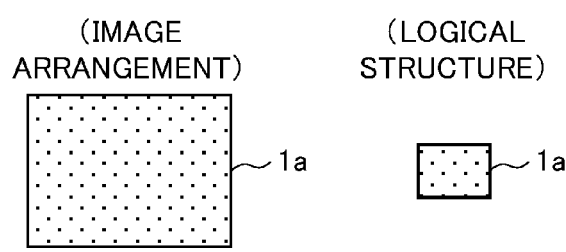
FIG.4B (IMAGE SELECTION) (LOGICAL STRUCTURE)
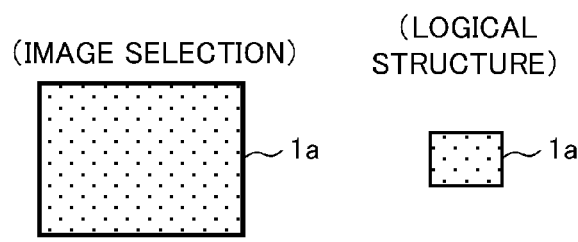
FIG.4C (IMAGE ARRANGEMENT) (LOGICAL STRUCTURE)
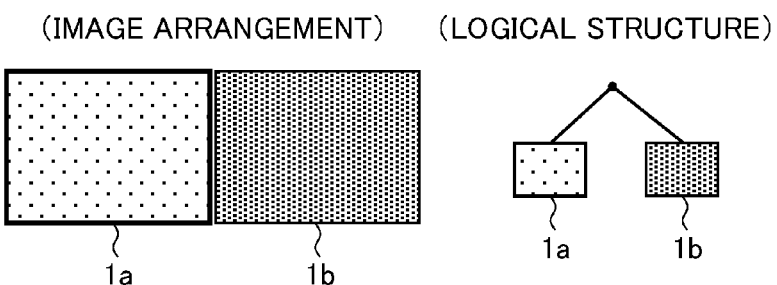

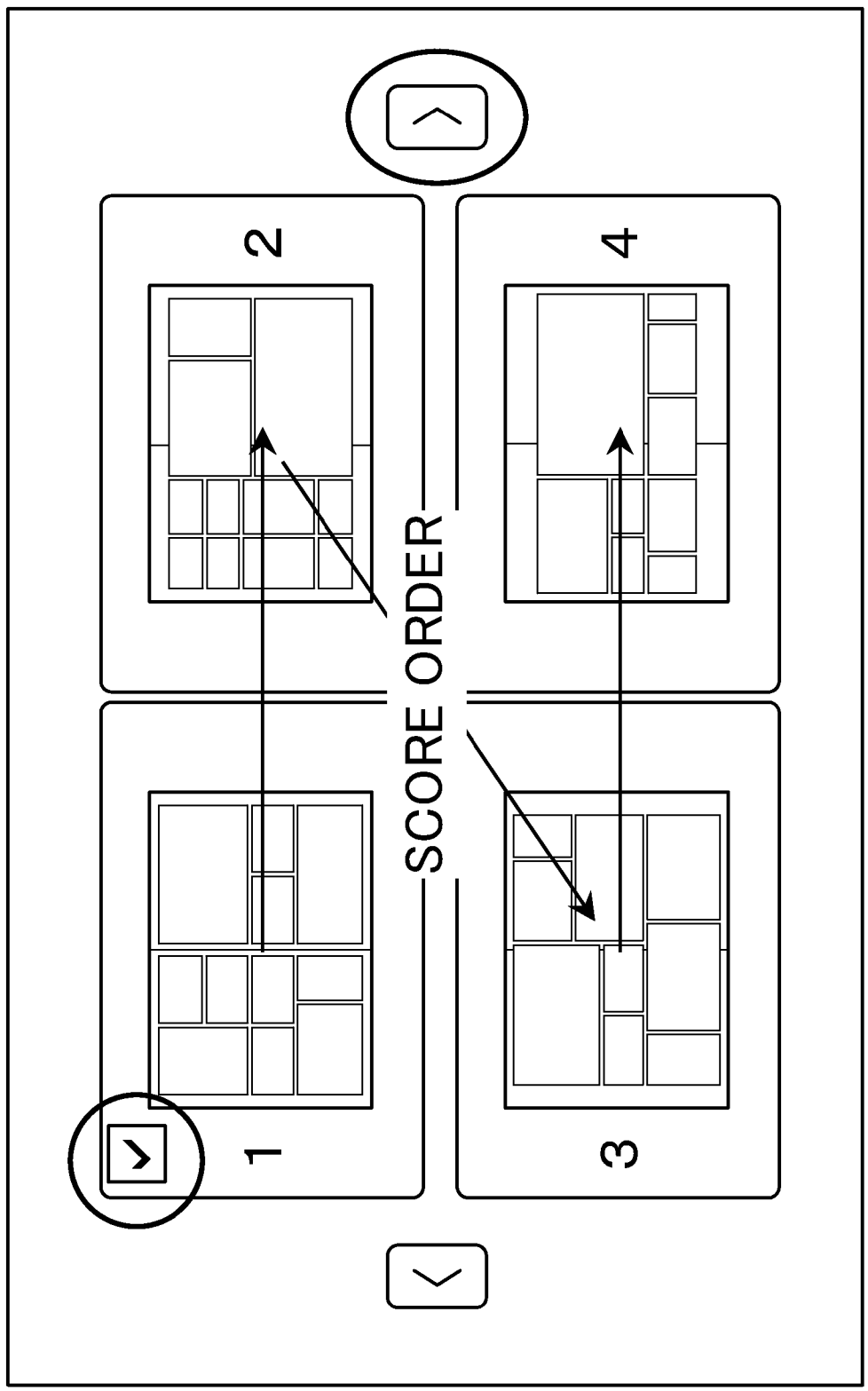

IMAGE LAYOUT GENERATING APPARATUS, IMAGE PRODUCT CREATION SYSTEM, IMAGE LAYOUT GENERATING METHOD, AND RECORDING MEDIUM FOR IMAGE LAYOUT GENERATING PROGRAM

CROSS-REFERENCE TO RELATED APPLICATIONS

The present application claims priority under 35 U.S.C. §119 to Japanese Patent Application No. 2014-066442, filed on Mar. 27, 2014. Each of the above application(s) is hereby expressly incorporated by reference, in its entirety, into the present application.

BACKGROUND OF THE INVENTION

The invention relates to an image layout generating apparatus for generating an image layout in which a plurality of images have been arranged to create an image product, an image product creation system using the image layout generating apparatus, an image layout generating method, and a recording medium in which is stored an image layout generating program for causing a computer to execute each step of the image layout generating method.

Image products, such as photo books (photo albums) that make use of a plurality of image data, have been generated automatically for some time, and automatic image data layout has been performed upon automatically generating photo books or the like (JP 2005-110280 A and JP 2010-262678 A (hereinafter referred to as Patent Documents 1 and 2)).

Patent Documents 1 and 2 disclose a method for arranging a set of objects (images) inside a predetermined area (layout area) using a binary tree, and disclose, in effect, that an image layout score is calculated, and an image layout is generated on the basis of the score.

SUMMARY OF THE INVENTION

An image layout in which a plurality of images were arranged can be automatically generated using Patent Documents 1 and 2, but as indicated in Patent Documents 1 and 2, even though an image layout was generated on the basis of a score that represents the uniformity of the surface area of a blank space and an image area or the like, there were cases where an image layout in which highly similar images were arranged far apart from one another was generated, and the generated image layout was not always the preferred image layout for the user.

An object of the invention is to provide an image layout generating apparatus, an image product creation system, an image layout generating method, and an image layout generating program and a recording medium capable of solving the aforementioned problem of the conventional art by generating a plurality of image layouts in which highly similar images are arranged in an assembled manner to create an image product such as a photo book.

In order to achieve the aforementioned object, the present invention provides an image layout generating apparatus, comprising: an image data acquiring unit for acquiring a plurality of image data; a first image arranging unit configured to extract a first piece of image data from the plurality of image data, and arrange a first image in a virtual arranging area based on the first piece of image data; an image data extracting unit configured to extract a new piece of image data to be arranged in the virtual arranging area from the plurality of image data; an arranged image selecting unit configured to calculate an inter-image distance between the new piece of image data extracted by the image data extracting unit and image data of each arranged image that has been arranged in the virtual arranging area, and select one of the arranged images based on the calculated inter-image distance; a second image arranging unit configured to arrange a new image based on the new image data to be above, below, left, or right of the arranged image selected by the arranged image selecting unit by adjusting a size while maintaining an aspect ratio of the new image to conform to the selected arranged image; a size adjusting unit configured to adjust the sizes while maintaining the aspect ratios of all the arranged images so as to configure one set of images in which all of the arranged images overall form a rectangle to generate the rectangular one set of images; and an apparatus controller configured to repeat an extraction of the new image data by the image data extracting unit, a selection of the arranged image by the arranged image selecting unit, an arrangement of the new image by the second image arranging unit, and a generation of the rectangular one set of images by the size adjusting unit until there is no longer any image data remaining to be arranged from among the plurality of image data in the virtual arranging area, and treat the rectangular one set of images that is generated last as an image layout.

In the image layout generating apparatus, it is preferable that the image data has an image feature value, and the arranged image selecting unit calculates the inter-image distance based on an image feature value of the new piece of image data and an image feature value of the image data of the arranged image.

It is preferable that the image feature value includes at least one of photograph date/time information, photograph location information, image color tone information, and image photograph-content information.

It is preferable for the image layout generating apparatus to further include an image feature value calculator configured to calculate an image feature value for each of the plurality of image data acquired by the image data acquiring unit.

It is preferable that the image feature value further includes an aspect ratio value obtained by dividing a horizontal width of the image data by a vertical width thereof, and the image data extracting unit extracts image data for which the aspect ratio value deviates from a range of 0.5 to 2.0 after extracting image data for which the aspect ratio value falls within the range of 0.5 to 2.0.

It is preferable that the apparatus controller generates a binary tree structure corresponding to the image layout in parallel with the arrangement of the first image by the first image arranging unit, the extraction of the new piece of image data by the image data extracting unit, the selection of the arranged image by the arranged image selecting unit, and the arrangement of the new image by the second image arranging unit.

In order to achieve the aforementioned object, the present invention further provides an image product creation system, comprising: the above-described image layout generating apparatus; a storage unit configured to store the plurality of image layouts generated by the image layout generating apparatus; a display unit configured to display the image layout stored in the storage unit; an image layout editor configured to edit the image layout based on user instructions; and an output unit configured to output the image layout based on the user instructions as an image product, wherein the display unit displays the binary tree structure together with the image layout; and the image layout editor edits the image layout based on editing of the binary tree structure by the user.

It is preferable for the image product creation system to further include: a score calculator configured to calculate a layout score based on the image layout, wherein, based on the layout score calculated by the score calculator, the display unit displays the plurality of image layouts stored in the storage unit.

It is preferable that the image layout editor allows the user to select one image layout from among the plurality of image layouts displayed on the display unit, and the output unit outputs the image layout selected by the user as the image product.

In order to achieve the aforementioned object, the present invention further provides an image layout generating method for generating an image layout obtained by laying out a plurality of images in a predetermined display area, comprising: a first image arranging step for extracting a first piece of image data from a plurality of image data, and arranging a first image in a virtual arranging area based on the first piece of image data; an image data extracting step for extracting a new piece of image data to be arranged in the virtual arranging area from the plurality of image data; an arranged image selecting step for calculating an inter-image distance between the new piece of image data extracted in the image data extracting step and the image data of each arranged image arranged in the virtual arranging area, and selecting one of the arranged images based on the calculated inter-image distance; a second image arranging step for arranging a new image based on the new image data to be above, below, left or right of the arranged image selected in the arranged image selecting step by adjusting the size while maintaining the aspect ratio of the new image to conform to the selected the arranged image; a size adjusting step for generating one set of images as a rectangle by adjusting the sizes while maintaining the aspect ratios of all the arranged images so as to configure the one set of images in which all of the arranged images overall form a rectangle; a repetition step for repeating in a sequential manner the image data extracting step, the arranged image selecting step, the second image arranging step, and the size adjusting step until there is no longer any the image data remaining to be arranged from among the plurality of image data in the virtual arranging area; and an image layout output step for outputting, as the image layout, the rectangular one set of images generated last by repeating the repetition step.

In the image layout generating method, it is preferable that the image data has an image feature value, and the arranged image selecting step calculates the inter-image distance based on an image feature value of the new piece of image data and an image feature value of the image data of the arranged image.

It is preferable that the image feature value includes at least one of photograph date/time information, photograph location information, image color tone information, and image photograph-content information.

It is preferable for the image layout generating method to further include an image feature value calculating step for calculating an image feature value for each of the plurality of image data.

It is preferable that the image feature value further includes an aspect ratio value obtained by dividing the horizontal width of the image data by the vertical width thereof, and the image data extracting step extracts image data for which the aspect ratio value deviates from a range of 0.5 to 2.0 after extracting image data for which the aspect ratio value falls within the range of 0.5 to 2.0.

It is preferable that a binary tree structure corresponding to the image layout is generated in parallel with the first image arranging step, the image data extracting step, the arranged image selecting step, and the second image arranging step.

In addition, the present invention provides an image layout generating program for causing a computer to execute each step of one of the image layout generating methods described above.

Further, the present invention provides a computer-readable recording medium in which is stored the above-described image layout generating program.

According to the invention, it is possible to generate a plurality of user-preferred image layouts in which highly similar images have been arranged in an assembled manner, enabling the creation of an image product having an image layout that is preferred by the user.

BRIEF DESCRIPTION OF THE DRAWINGS

FIG. 2 is a flowchart illustrating an image layout generation flow in the image layout generating apparatus of FIG. 1.

FIG. 3A is a schematic drawing illustrating a plurality of images for performing a layout in the image layout generating apparatus of FIG. 1, and FIG. 3B is a schematic drawing illustrating a layout area in which the layout is to be performed.

FIG. 4A is a schematic drawing illustrating a first image arrangement and the logical structure (binary tree structural element) thereof, FIG. 4B is a schematic drawing illustrating a first image selection and the logical structure thereof, and FIG. 4C is a schematic drawing illustrating an example of a second image arrangement and the logical structure thereof.

FIG. 15 is a schematic drawing illustrating an example of an image layout selecting screen in which four image layouts arranged by score are displayed.

DETAILED DESCRIPTION OF THE INVENTION

The image layout generating apparatus, image product creation system, image layout generating method, and image layout generating program and recording medium pertaining to the invention will be explained in detail below on the basis of the preferred embodiments illustrated in the attached drawings.

Embodiment 1

Figure 1:
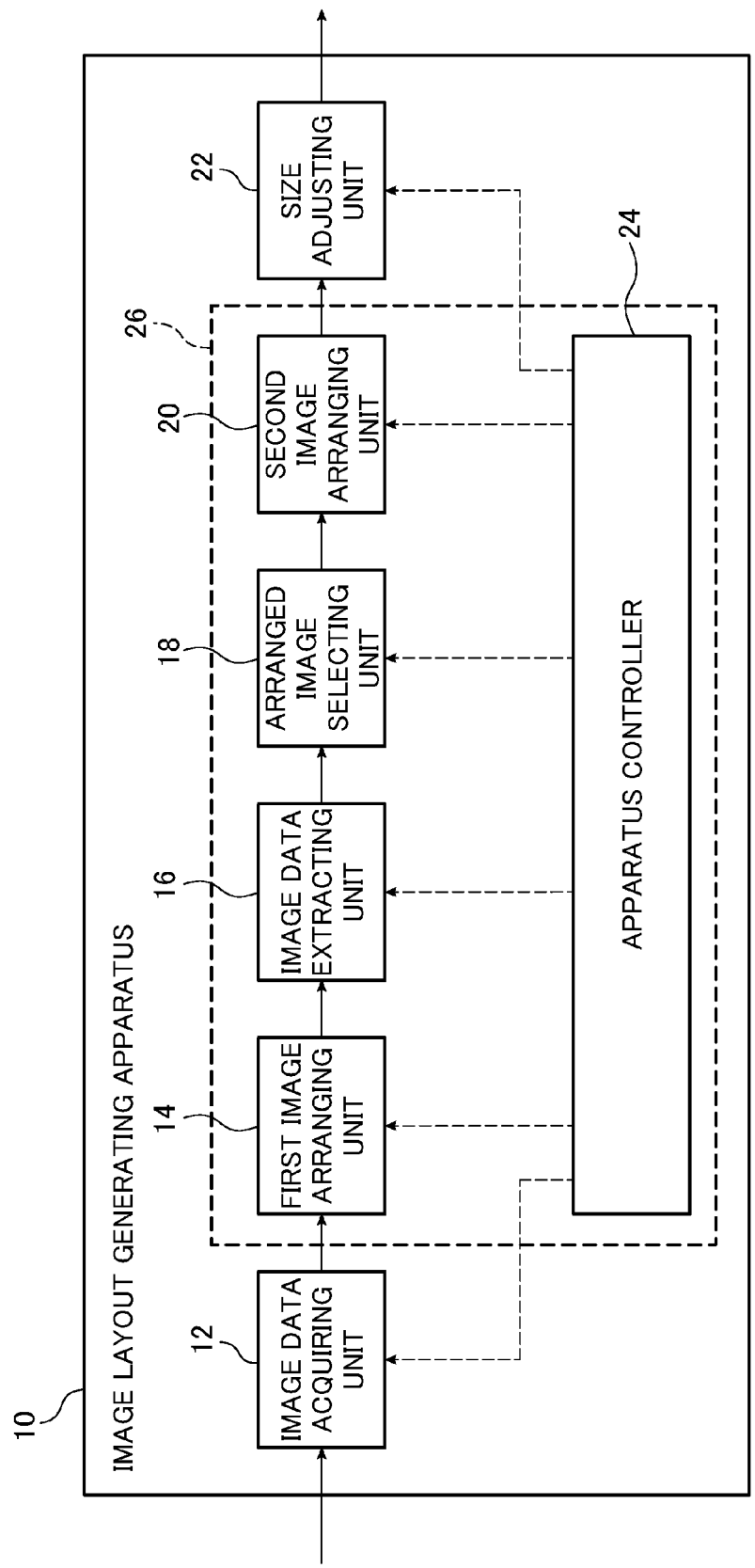
FIG. 1 is a block diagram illustrating the overall configuration of an image layout generating apparatus pertaining to a first embodiment of the invention.

FIG. 1 is a block diagram illustrating the overall configuration of an image layout generating apparatus 10 pertaining to a first embodiment of the invention. The image layout generating apparatus 10 of FIG. 1 comprises an image data acquiring unit 12, a first image arranging unit 14, an image data extracting unit 16, an arranged image selecting unit 18, a second image arranging unit 20, and a size adjusting unit 22, which are connected sequentially, and an apparatus controller 24 connected to each of these units.

The image data acquiring unit 12 acquires a plurality of image data to be used in an image layout from an image data recorder (image accumulation device, image storage), a recording medium, or the like in which image data is stored, and may acquire stored image data by connecting to a PC, an image server, and the like, or may acquire image data stored in a recording medium by reading the recording medium used in such as a digital still camera (DSC) or a mobile telephone, for example.

The first image arranging unit 14 is configured to arrange a first image in a virtual layout area (virtual area) for generating an image layout, and extracts a first piece of image data (first image data) from a plurality of image data acquired by the image data acquiring unit 12, and arranges this first image data in the virtual area. The virtual area is a virtual layout area configured in an internal memory (not illustrated) of the image layout generating apparatus 10, for example.

The image data extracting unit 16 is configured to extract image data to be arranged anew in the virtual area (new image data) from a plurality of image data exclusive of the image data of an image (arranged image) that has already been arranged in the virtual area. The extraction of new image data by the image data extracting unit 16 may be performed randomly, or may be performed on the basis of a predetermined criterion, such as an image feature value, which will be described below.

The arranged image selecting unit 18 selects one image from among the arranged images. The arranged image selecting unit 18 calculates the distances (inter-image distance) between the image data of each of the arranged images and the new image data extracted by the image data extracting unit 16, and selects the arranged image with the shortest inter-image distance.

The inter-image distance is calculated here on the basis of the image feature value of the image data, and the difference between image feature values is calculated as the inter-image distance, for example. The image feature value may include photograph date/time information, photograph location information and other such meta-information, and/or image analysis results obtained by performing image analysis on the basis of the image data, and the image analysis results may include the color tone of an image or the contents of a photograph, and so forth. The image feature value may be stored in association with the image data, may be stored together with the image data as image data meta-information, or may be stored as separate data from the image data, for example.

In the first embodiment, each piece of image data has a predetermined image feature value that can be compared beforehand. Thus, the inter-image distance calculated from the image feature values of respective pieces of image data constitute an index representing the similarities between pieces of image data; the less the inter-image distance, the greater the similarity between the pieces of image data, and the longer the inter-image distance, the lower the similarity between the pieces of image data.

Accordingly, the arranged image selecting unit 18 selects an arranged image that has the highest similarity to a new piece of image data.

The second image arranging unit 20 arranges a new piece of image data extracted by the image data extracting unit 16 to be above, below, left or right of the arranged image selected by the arranged image selecting unit 18 so as to configure the selected arranged image and the new image into one rectangular set by performing either enlargement processing or reduction processing while maintaining the aspect ratio of the new image. The arrangement of the new image (above, below, left, right) may be done randomly, or may be done using a predetermined criterion, for example, in order from top to bottom and left to right.

The size adjusting unit 22 performs size adjustments while maintaining the respective aspect ratios of the arranged images such that the arranged images arranged in the virtual area configure an overall rectangular set of images. The size adjustments of the arranged images are performed in order from the image most recently arranged in the virtual area (that is, so that the initially arranged image is adjusted last).

The apparatus controller 24 generates an image layout in accordance with an image layout generating method, which will be described below, by controlling each part of the image layout generating apparatus 10. Also, the apparatus controller 24, together with the first image arranging unit 14, the image data extracting unit 16, the arranged image selecting unit 18, and the second image arranging unit 20, comprises a binary tree generator 26, which is a characteristic feature of the invention, and in the process in which the apparatus controller 24 generates an image layout using the first image arranging unit 14, the image data extracting unit 16, the arranged image selecting unit 18, and the second image arranging unit 20, the apparatus controller 24, together with the first image arranging unit 14, the image data extracting unit 16, the arranged image selecting unit 18, and the second image arranging unit 20, generates a binary tree structure corresponding to the logical structure of the image layout.

In the invention, a "binary tree structure" is a structure in which the terminal components of the binary tree correspond to the arranged image of an image layout as illustrated in FIG. 4C, FIG. 5A, FIG. 5B, FIG. 6A, FIG. 6B, FIG. 10B, and the like, which will be described below. A point within a binary tree structure at which a binary tree junction exists is called a "node," and a terminal point where there is no junction is called a "leaf." In a binary tree structure, two branches branch off from a single node, and a lower-level node may exist on a branched-off branch, or a leaf may exist at the terminal component of a branch that does not have a lower-level node. The top-most node is call a "root." In a binary tree structure for generating an image layout in the invention, a leaf represents an arranged image of the image layout.

The generation of an image layout in accordance with the invention in which a binary tree structure has been used as a logical structure will be described in detail below.

The apparatus controller 24 repeatedly extracts new image data using the image data extracting unit 16, selects an arranged image using the arranged image selecting unit 18, arranges a new image using the second image arranging unit 20, and adjusts the size of the arranged images arranged in the virtual area using the size adjusting unit 22 until all the image data acquired by the image data acquiring unit 12 are arranged in the virtual area. The apparatus controller 24 generates a rectangular set of images having all the image data, and outputs this set of images as a single image layout.

Next, an image layout generating operation (image layout generating method) in the image layout generating apparatus of FIG. 1 will be described based on the flowchart illustrated in FIG. 2. The explanation given here will be premised on the fact that the image product is a photo book, and that the image layout is performed on predetermined pages (facing pages) of the photo book. The generation of a binary tree in the binary tree generator 26 will be performed between the apparatus controller 24 and the first image arranging unit 14, the image data extracting unit 16, the arranged image selecting unit 18, and the second image arranging unit 20, respectively, but for the sake of simplification, a description of the apparatus controller 24 in the generation of the binary tree will be omitted here.

First, as Step S1, the image data acquiring unit 12 acquires a plurality of image data from an image data recorder, a recording medium, or the like for use in an image layout. The invention generates an image layout here by acquiring four pieces of image data corresponding to the images 1a to 1d as illustrated in FIG. 3A, arranging these images 1a to 1d in a virtual area, generating an image layout, and arranging the generated image layout in a layout area S illustrated in FIG. 3B.

In Step S2, the first image arranging unit 14 selects one piece of image data from the plurality of image data acquired by the image data acquiring unit 12, arranges this piece of image data in the aforementioned virtual area as a first image (first image), and generates a binary tree corresponding to an image arrangement of the images in the virtual area. The image arrangement of FIG. 4A indicates an image arrangement in the virtual area, and the logical structure indicates the logical structure of the image arrangement in the virtual area (the structure of the binary tree components (leaves)). At this point, as illustrated in FIG. 4A, the first image arranging unit 14 selects the image data of an image 1a from the plurality of image data, arranges the image 1a in the virtual area as the first image, and generates a leaf comprising a binary tree that corresponds to the image arrangement of the image 1a in the virtual area.

Next, in Step S3, the image data extracting unit 16 extracts a new piece of image data to be arranged in the virtual area from among the plurality of image data, excluding the piece of image data that has already been arranged in the aforementioned virtual area. In the example illustrated in the drawing, since the image 1a has been arranged in the virtual area as described hereinabove, the image data extracting unit 16 extracts the image data of an image 1b, for example, from among the images 1b to 1d exclusive of the image 1a as the new piece of image data.

In Step S4, the arranged image selecting unit 18 calculates, on the basis of the aforementioned image feature value, the inter-image distance between the new piece of image data extracted by the image data extracting unit 16 and the image data of each arranged image that has already been arranged in the virtual area, and selects, from among the arranged images arranged in the virtual area, the arranged image with the shortest inter-image distance to the new piece of image data. As indicated by image selection in FIG. 4B, since only the image 1a has been arranged in the virtual area at this point, consequently the arranged image with the shortest inter-image distance to the new image data of the image 1b that is extracted by the extracting unit 16 is necessarily the arranged image 1a that has already been arranged in the virtual area, and as such, a calculation of the inter-image distance between the image data of the image 1a and the image data of the image 1b by the arranged image selecting unit 18 may be omitted. The arranged image selecting unit 18 selects the image 1a as the arranged image with the shortest inter-image distance.

In Step S5, the second image arranging unit 20 arranges the new image extracted by the image data extracting unit 16 to be above, below, left or right of the one arranged image selected by the arranged image selecting unit 18 by performing a size adjustment (either enlargement processing or reduction processing) while maintaining the aspect ratio, configures one rectangular set using the selected arranged image and the newly arranged image, and updates the binary tree by adding the newly arranged image to a leaf of the binary tree. The arrangement of the images is performed randomly by the second image arranging unit 20, for example. At this point, as indicated by the image arrangement in FIG. 4C, the second image arranging unit 20 arranges the image 1b, which has been subjected to the size adjustment while maintaining the aspect ratio to conform to the height of the image 1a, to be on the right side of the image 1a arranged in the virtual area, configures one rectangular set using the image 1a and the image 1b, and forms a logical structure in which the image 1a and the image 1b are linked by one node as a binary tree having the image 1a and the image 1b as leaves. A binary tree has two leaves with respect to one node, one leaf and one lower-level node, or two lower-level nodes, and one leaf represents one image in the generation of an image layout in the invention. A node also includes information (node information) that defines the physical relationship of images respectively corresponding to two leaves, and an image corresponding to one leaf and a plurality of images linked to one lower-level node, to two lower-level nodes, or to one or two lower-level nodes. Accordingly, in the example illustrated in the drawing, node information to the effect that the image 1b is to be arranged on the right side of the image 1a is included in the node that links the image 1a to the image 1b.

Next, in Step S6, the size adjusting unit 22, while maintaining the rectangular set configured in the aforementioned Step S5, performs the size adjustment on the basis of the binary tree generated in the same Step S5 while maintaining the aspect ratios of the respective arranged images so that the arranged images arranged in the virtual area overall form a single rectangular set of images. Since the image 1*a* and the image 1*b* in the image arrangement of FIG. 4C already form a rectangular set of images, there is no need for the size adjustment of Step S6. The size adjustment of Step S6 will be described in detail in Step S7, which is a repetition step.

In Step S7, the apparatus controller 24 checks whether or not all the image data acquired in Step S1 has been arranged in the virtual area, and upon unarranged image data existing, repeats the aforementioned Steps S3 to S6, and the present Step S7 once again. The apparatus controller 24 ceases the repetitions and advances to Step S8 upon a confirmation that all the image data acquired by the image data acquiring unit 12 have been arranged in the virtual area. In the example illustrated in FIG. 3A, four pieces of image data corresponding to images 1*a* to 1*d* are acquired in the aforementioned Step S1, and at this point in time, the image data arranged in the virtual area are the two pieces of image data of the image 1*a* and the image 1*b*. Accordingly, Steps S3 to S7 are repeated until the remaining two pieces of image data, i.e. an image 1*c* and an image 1*d*, have been arranged in the virtual area.

In accordance with Step S7, the processing returns to Step S3 (second), and the image data extracting unit 16 extracts the image data of the image 1*c* as the new image data to be arranged in the virtual area, in Step S4 (second), the arranged image selecting unit 18 respectively calculates the inter-image distance between the image data of the image 1*c*, which is the new image data, and the image data of the image 1*a* and the image data of the image 1*b*, which have been arranged in the virtual area, and selects one arranged image on the basis of the respective inter-image distance that have been calculated. Upon the inter-image distance between the image 1*c* and the image 1*a* being less than the inter-image distance between the image 1*c* and the image 1*b* here, the arranged image selecting unit 18 selects the image 1*a* from among the image 1*a* and the image 1*b* arranged in the virtual area as indicated by the image selection of FIG. 5A.

Figure 5A:
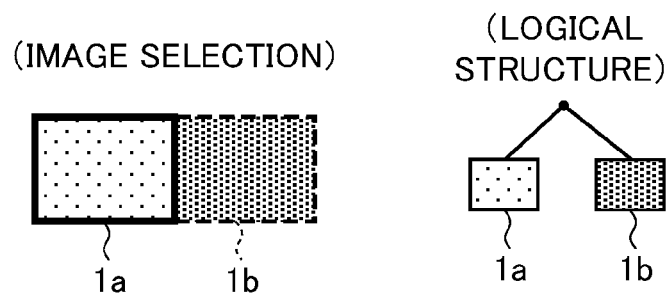
FIG. 5A is a schematic drawing illustrating an example of a second image selection and the logical structure (binary tree structure) thereof.
Figure 5B:
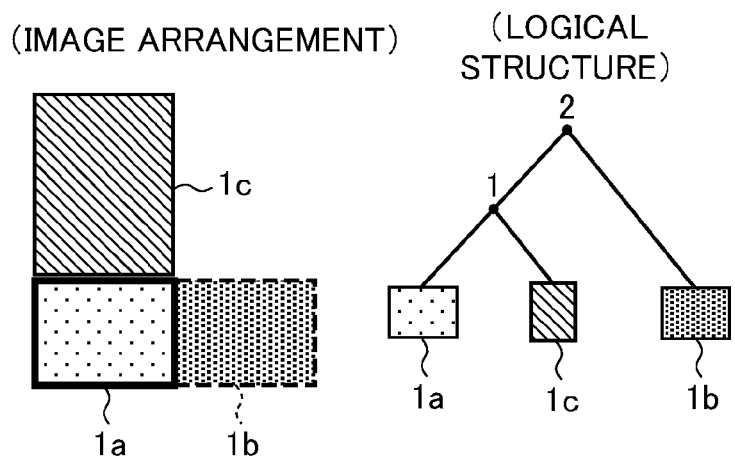
FIG. 5B is a schematic drawing illustrating an example of a third image arrangement and the logical structure thereof.

Next, in Step S5 (second), the second image arranging unit 20 arranges the new image 1*c*, which has been subjected to the size adjustment while maintaining the aspect ratio to conform to the width of the image 1*a*, to be above the selected image 1*a* as indicated by the image arrangement of FIG. 5B, and adds the new image 1*c* to the binary tree comprising the image 1*a* and the image 1*b* as indicated by the logical structure of FIG. 5B. In the binary tree structure, the addition of the image 1*c* to the binary tree is performed by adding a new node (lower-level node) to the branch on the image 1*a* side so that the link between the new image 1*c* and the selected image 1*a* becomes closer, assembling the image 1*a* and the image 1*c* under a single node, and using another node (a higher-level node) to assemble the image 1*b* with the node linking the image 1*a* and the image 1*c*. As described above, in the example illustrated in the drawing, the node linking the image 1*a* to the image 1*c* has node information to the effect that the image 1*c* is to be arranged above the image 1*a*. The binary tree adopts a hierarchical structure, and is divided into levels, i.e. level 1, level 2, . . . , in order from the node at the bottommost layer, and the structure that includes a node can be ascertained by the node level. A level 1 node, for example, is one that assembles two images as leaves, and corresponds here to the node that links the image 1*a* and the image 1*c*. A level 2 node is one that links a level 1 node with either a level 1 node or a leaf comprising a single image, and corresponds here to the node that links the node of the image 1*a* and the image 1*c* with the image 1*b* leaf.

Figure 5C:
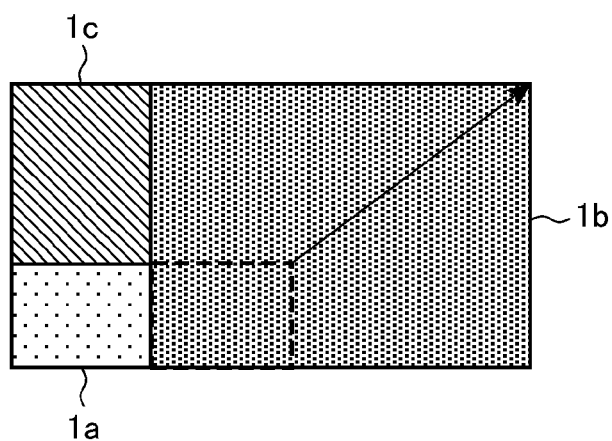
FIG. 5C is a schematic drawing illustrating an example of a rectangular set of images generated in accordance with the third image arrangement.

Next, in Step S6 (second), the size adjusting unit 22 performs size adjustments on the basis of the binary tree structure illustrated in FIG. 5B so that the arranged images arranged in the virtual area form an overall rectangular set of images. Specifically, the size adjusting unit 22, on the basis of the level 1 node, performs size adjustments while maintaining aspect ratios so that the image 1*a* and the image 1*c* form a rectangular set (actually, since adjustments are made in the aforementioned Step S5 so as to form one rectangular set, size adjustments are not required), and also performs size adjustments while maintaining aspect ratios on the basis of the level 2 node so that the image 1*a*, the image 1*b*, and the image 1*c* form one rectangular set, that is, performs a size adjustment while maintaining the aspect ratio of the image 1*c* so that the size (height) of the image 1*c* coincides with the size (height) of the rectangular set of the image 1*a* and the image 1*b* as illustrated in FIG. 5C. Thus, the rectangular set of images illustrated in FIG. 5C is generated by performing size adjustments while maintaining aspect ratios on the basis of the binary tree structure.

Next, in Step S7 (second), in the same manner as is described hereinabove, the apparatus controller 24 confirms that, of the image data of images 1*a* to 1*d* acquired in Step S1, the image data of the image 1*d* has not been arranged, and repeats Steps S3 to S7. In Step S3 (third), the image data extracting unit 16 extracts the image data of the image 1*d* as new image data to be arranged in the virtual area, and as Step S4 (third), the arranged image selecting unit 18 calculates the inter-image distances between the image data of the image 1*d*, which is the new image data, and the image data of the images 1*a* to 1*c*, which have been arranged in the virtual area, and selects one image on the basis of the calculated inter-image distance. Upon the inter-image distance between the image 1*d* and the image 1*c* being the smallest of the respectively calculated inter-image distance here, the arranged image selecting unit 18 selects the image 1*c* from among the image 1*a* to the image 1*c* arranged in the virtual area as indicated by the image selection of FIG. 6A.

Figure 6A:
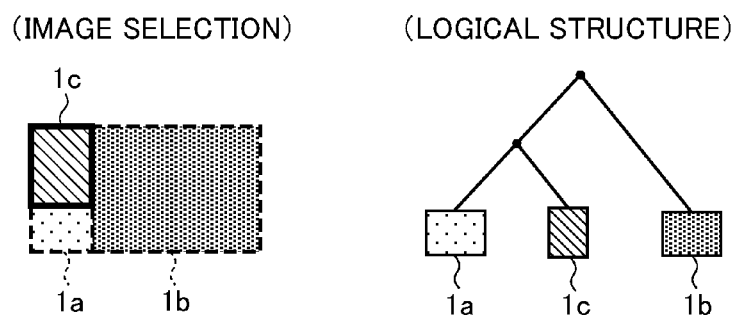
FIG. 6A is a schematic drawing illustrating an example of a third image arrangement and the logical structure (binary tree structure) thereof.
Figure 6B:
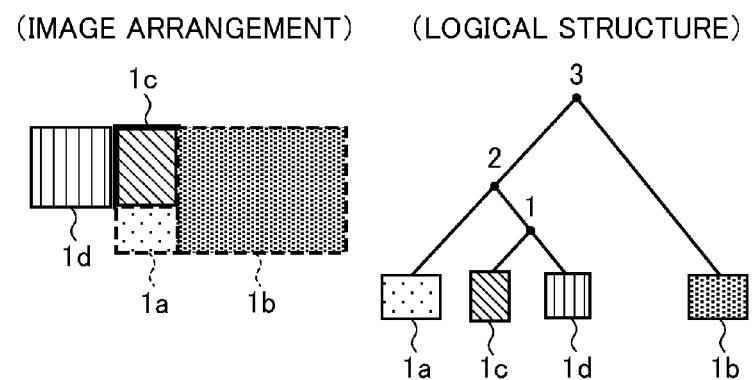
FIG. 6B is a schematic drawing illustrating an example of a fourth image arrangement and the logical structure thereof.

Next, in Step S5 (third), the second image arranging unit 20 configures a rectangular set by arranging the new image 1*d*, which has been subjected to the size adjustment while maintaining the aspect ratio to conform to the height of the image 1*c*, on the left side of the selected image 1*c* as indicated by the image arrangement of FIG. 6B, and adds the new image 1*d* to the binary tree structure comprising the images 1*a* to 1*c* as indicated by the logical structure of FIG. 6B. The addition of the image 1*d* to the binary tree structure is performed by providing to the image 1*c* leaf, that is, to the branch on the image 1*c* side with a new level 1 node that links the image 1*c* to the image 1*d*.

Figure 6C:
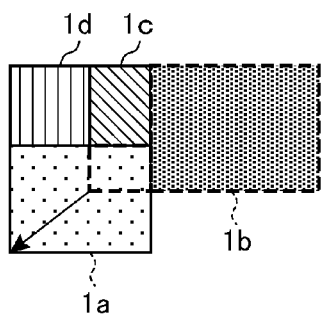
FIG. 6C is a schematic drawing illustrating a sequential size adjustment of a arranged image on the basis of the logical structure.
Figure 6D:
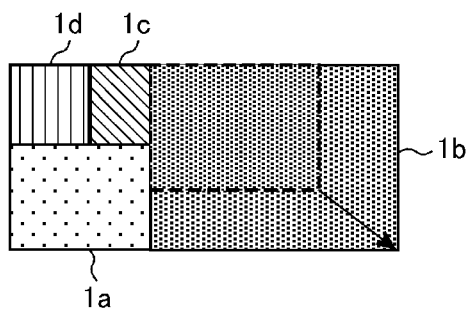
FIG. 6D is a schematic drawing illustrating an example of a rectangular set of images generated in accordance with the fourth image arrangement.

Then, in Step S6 (third), the size adjusting unit 22 configures an overall rectangular set of images by performing size adjustments while maintaining aspect ratios for the images 1*a* to 1*d* arranged in the virtual area on the basis of the aforementioned binary tree structure. Specifically, on the basis of the binary tree structure indicated by the logical structure of FIG. 6B, the size adjusting unit 22 configures a new rectangular set of images with respect to the rectangular set comprising the image 1*c* and the image 1*d* by arranging the image 1*a*, which has been subjected to the size adjustment while maintaining the aspect ratio on the basis of the level 2 node to conform to the horizontal width in the downward direction of the rectangular set comprising the image 1*c* and the image 1*d*, as illustrated in FIG. 6C, and, as illustrated in FIG. 6D, on the basis of the level 3 node, generates an overall rectangular set of images by arranging the image 1*b*, which has been subjected to the size adjustment while maintaining the aspect ratio to conform to the height, rightward of the new rectangular set illustrated in FIG. 6C.

Figure 7:
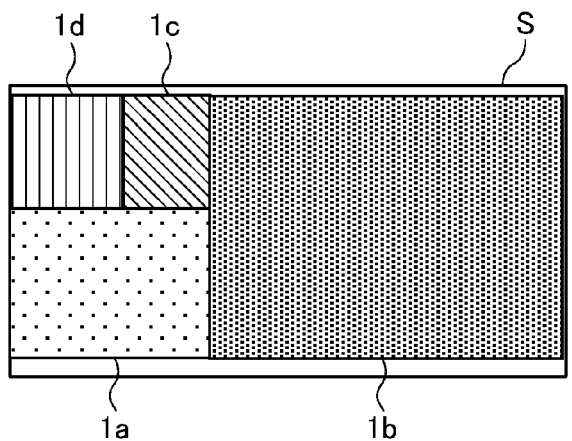
FIG. 7 is a schematic drawing illustrating an example of a case in which an image layout generated in a virtual area has been arranged in the layout area where the layout is actually to be performed.

In Step S7 (third), the apparatus controller 24 confirms that all of the image data acquired in Step S1 have been arranged and advances to Step S8, and in Step S8, the size adjusting unit 22 performs the size adjustment so that the generated rectangular set of images corresponds to a layout area S (display area, printing area) of a predetermined page of the photo book, and outputs the layout area S as a single image layout as illustrated in FIG. 7.

The generation of an image layout in the image layout generating apparatus 10 is not limited to one layout, and it is possible to generate image layouts in a plurality of ways from the same plurality of image data by changing the new image data that is extracted by the image data extracting unit 16 and the arrangement of the new image by the second image arranging unit 20. Even when the extraction of the new image data by the image data extracting unit 16 is fixed as described above (that is, upon the first extraction being fixed as the image 1a, the second extraction is fixed as the image 1b, and the third extraction is fixed as the image 1c), for example, upon consideration being given to the image layouts that are conceivable based on the logical structure of FIG. 6B, there are four ways of arranging the images, i.e. to be above, below, left or right, in the level 1 node, and similarly, four ways each of arranging the images are conceivable in the level 2 node and level 3 node, thereby making it possible to generate an image layout in 64 ways.

Figure 8A:
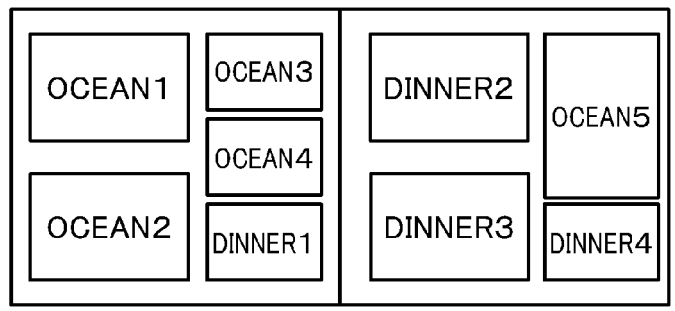
FIG. 8A is a schematic drawing illustrating an example of an image layout that has been laid out on the basis of the conventional art.

In the automatic generation of an image layout in the conventional art, for example, a plurality of image layouts can be generated, but as illustrated in FIG. 8A, there are cases where an image layout is generated in which a dinner photograph (dinner 1) is assembled together with ocean photographs (ocean 1 to ocean 4) on the left page of the photo book, and an ocean photograph (ocean 5) is assembled together with the dinner photographs (dinner 2 to dinner 4) on the right page of the photo book.

Figure 8B:
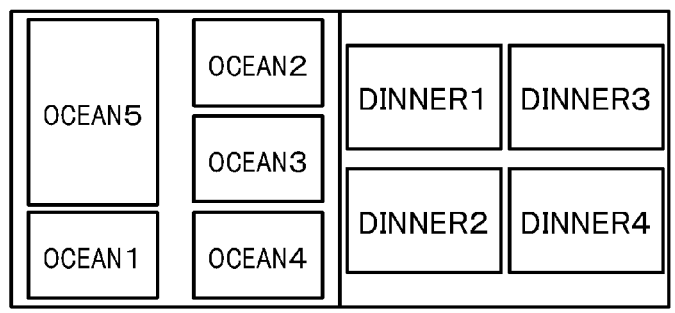
FIG. 8B is a schematic drawing illustrating an example of an image layout generated by the image layout generating apparatus pertaining to the first embodiment.

Upon an image layout being generated by the image layout generating apparatus 10 pertaining to the first embodiment of the invention, as illustrated in FIG. 8B, it is possible to generate a high-user-satisfaction image layout in which the ocean photographs (ocean 1 to ocean 5) are assembled on one page and the dinner photographs (dinner 1 to dinner 4) are assembled on one page.

As described hereinabove, according to the image layout generating apparatus 10 pertaining to the first embodiment of the invention, a plurality of image layouts that provide a user with a high sense of satisfaction can be generated because it is possible to generate an image layout in which the aspect ratios of the images are maintained and images that are highly similar to one another are arranged together regardless of the number of images to be laid out.

Embodiment 2

The image layout generating apparatus 10 pertaining to the first embodiment generated an image layout on the premise that the image data had an image feature value, but image data does not always have an image feature value. Therefore, an image layout generating apparatus may comprise a configuration in which an image feature value is calculated for each piece of image data after a plurality of image data has been acquired.

Figure 9:
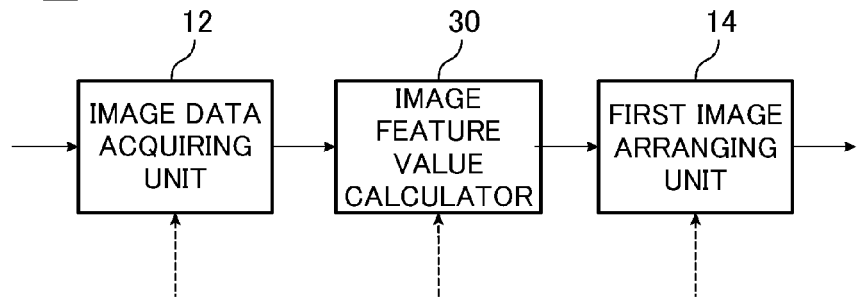
FIG. 9 is a block diagram illustrating a portion of an image layout generating apparatus pertaining to a second embodiment of the invention.

FIG. 9 is a block diagram illustrating the partial configuration of an image layout generating apparatus 28 pertaining to a second embodiment of the invention. The image layout generating apparatus 28 of FIG. 9 has an image feature value calculator 30 between the image data acquiring unit 12 and the first image arranging unit 14, and calculates respective image feature values for a plurality of image data using the image feature value calculator 30 and performs an image layout on the basis of the calculated image feature values. With the exception of the image feature value calculator 30, the image layout generating apparatus 28 comprises the same configuration as the image layout generator 10, and as such, the description of the configuration and operation of the image layout generating apparatus 28 will focus on the image feature value calculator 30, and descriptions of the other components will be omitted.

The image feature value calculator 30 calculates the respective image feature values of image data for a plurality of image data acquired by the image data acquiring unit 12. As is described above, the image feature value calculator 30 may calculate meta-information such as photograph date/time information, photograph location information as image feature values, may perform image analysis based on the image data and may use information such as the color tone of an image and/or the content of a photograph calculated in accordance with the image analysis (image analysis results) as image feature values, or may calculate an image feature value by combining the aforementioned meta-information and image analysis results. The image feature value enables comparisons to be made between a plurality of image data in order to calculate an inter-image distance, and is calculated on the basis of a predetermined criterion.

The aforementioned image analysis may be performed by a component other than the image feature value calculator 30, and an image analysis result may be stored in association with a piece of image data as one piece of image data meta-information, for example.

Figure 10A:
FIG. 10A is a schematic drawing illustrating a plurality of images to be used in an image layout.
Figure 10B:
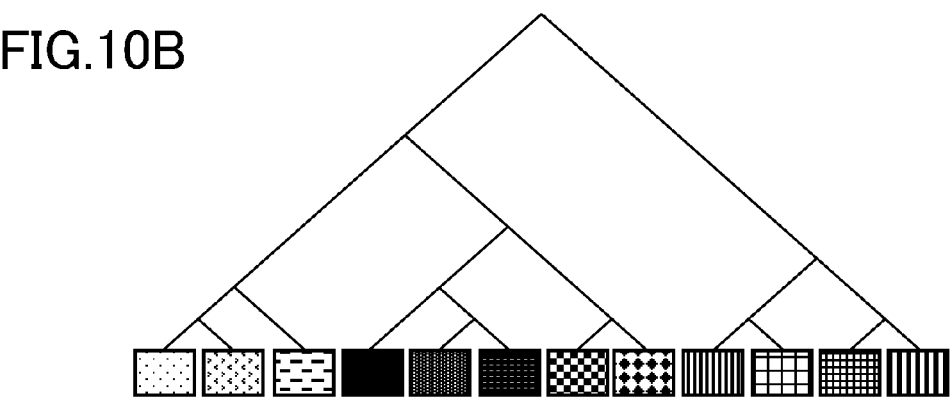
FIG. 10B is a schematic drawing illustrating an example of a binary tree structure generated on the basis of an image feature value of the plurality of images.
Figure 10C:
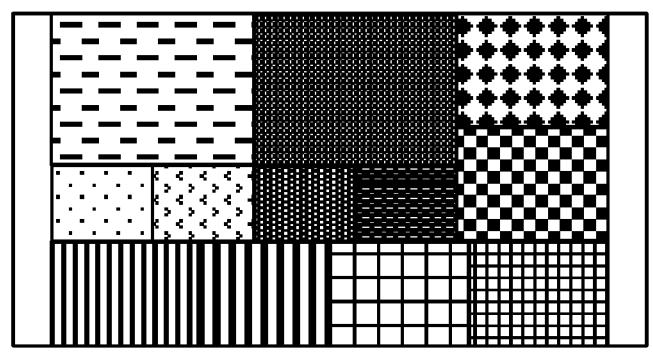
FIG. 10C is a schematic drawing illustrating an example of an image layout generated on the basis of the binary tree structure of FIG. 10B.

The image feature value calculator 30, for example, calculates the respective image feature values of a plurality of images like those illustrated in FIG. 10A, and in accordance with the above-described Steps S1 to S8 being performed by the first image arranging unit 14, the image data extracting unit 16, the arranged image selecting unit 18, the second image arranging unit 20, and the size adjusting unit 22 of the image layout generating apparatus 28, can generate the binary tree structure illustrated in FIG. 10B in which related images are assembled in accordance with an image feature value, and can generate an image layout having an arrangement related to photograph date/time, photograph location, photograph content, and so forth, like that illustrated in FIG. 10C.

The above-described image feature value calculator 30 may respectively calculate the aspect ratio values (as used here, values obtained in accordance with the horizontal width/height (vertical width) of an image) of a plurality of image data acquired by the image data acquiring unit 12 as image feature values. In this case, upon the aspect ratio values calculated by the image feature value calculator 30 deviating from a predetermined range, that is, upon an image such as a panoramic photograph being included in the acquired plurality of image data, the first image arranging unit 14 and the image data extracting unit 16 may extract a first image data and a new image data by first extracting image data with aspect ratio values that fall within the predetermined range so as to extract image data with aspect ratio values that deviate from the predetermined range after all the image data with aspect ratio values that fall within the predetermined range have been extracted. For example, 0.5 to 2.0 can be given as the range of aspect ratio values. The aspect ratio value (horizontal width/vertical width) of an ordinary photograph is either 1.33 (4/3), 1.50 (3/2), or 1.78 (16/9), and falls within the aforementioned range of aspect ratio values 0.5 to 2.0 even when the height and width of a photograph have changed places.

Figure 11:
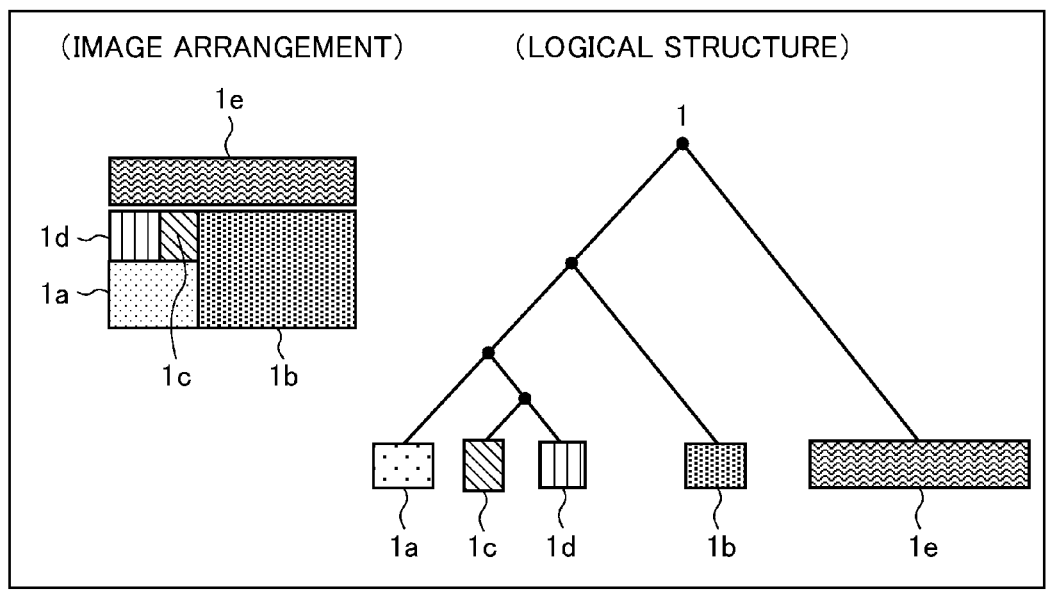
FIG. 11 is a schematic drawing illustrating a logical structure illustrating an example of a case in which images with aspect ratios that exceed a prescribed value are to be arranged, and the image arrangement thereof.

Upon the image 1e, which can be considered a panoramic photograph, being arranged last as indicated by the logical structure of FIG. 11, it is possible to generate a set of images with an unbiased aspect ratio as indicated by the image arrangement of FIG. 11.

The image feature value calculator 30 may also calculate the respective image feature values for a plurality of image data, and sort the plurality of image data into a plurality of image groups on the basis of the calculated image feature values. An image group comprises at least one piece of image data. The image feature value calculator 30, for example, arranges the plurality of image data on the basis of the image feature values, and sorts the plurality of image data into a plurality of image groups by delimiting the plurality of image data at locations where the image feature value deviates by a predetermined value or more.

Figure 12A:
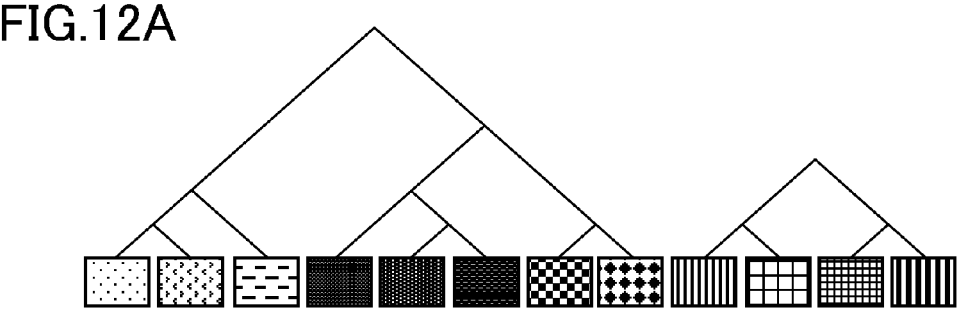
FIGS. 12A and 12B are illustrations illustrating the relationship between a binary tree structure corresponding to an image layout and the facing pages of a photo book.
Figure 12B:
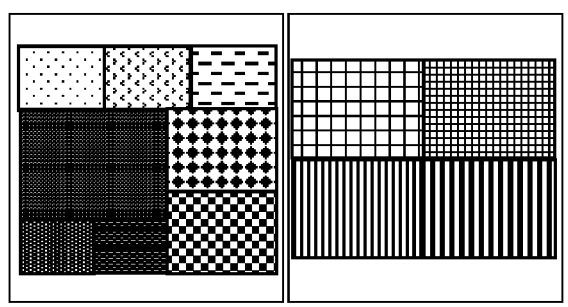

Upon a plurality of image data being laid out on facing pages of a photo book, for example, the image feature value calculator 30 may sort the plurality of image data respectively arranged on the left page and the right page beforehand, and generate an image layout for each image group as illustrated in FIG. 12A. By performing a sorting beforehand, image data that is arranged straddling the left page and the right page is eliminated, making it possible to generate an image layout that provides the user with a high sense of satisfaction as illustrated in FIG. 12B.

The image feature value calculator 30 may also calculate the respective image feature values of a plurality of image data in the same manner as the sorting described above, and determine the arrangement order of the plurality of image data on the basis of the image feature values. In this case, for example, the image data extracting unit 16 may extract the image data on the basis of the aforementioned arrangement order, and the arranged image selecting unit 18 may select an arranged image on the basis of the aforementioned arrangement order.

Since an image layout in which highly similar images are arranged together can be generated in the same manner as described above, it is possible to generate a plurality of image layouts that provide the user with a high sense of satisfaction.

From the above, according to the image layout generating apparatus 28 pertaining to the second embodiment of the invention, an image layout in which highly similar images are arranged together can be generated in the same manner as the first embodiment, making it possible to generate a plurality of image layouts that provide the user with a high sense of satisfaction.

Embodiment 3

Figure 13:
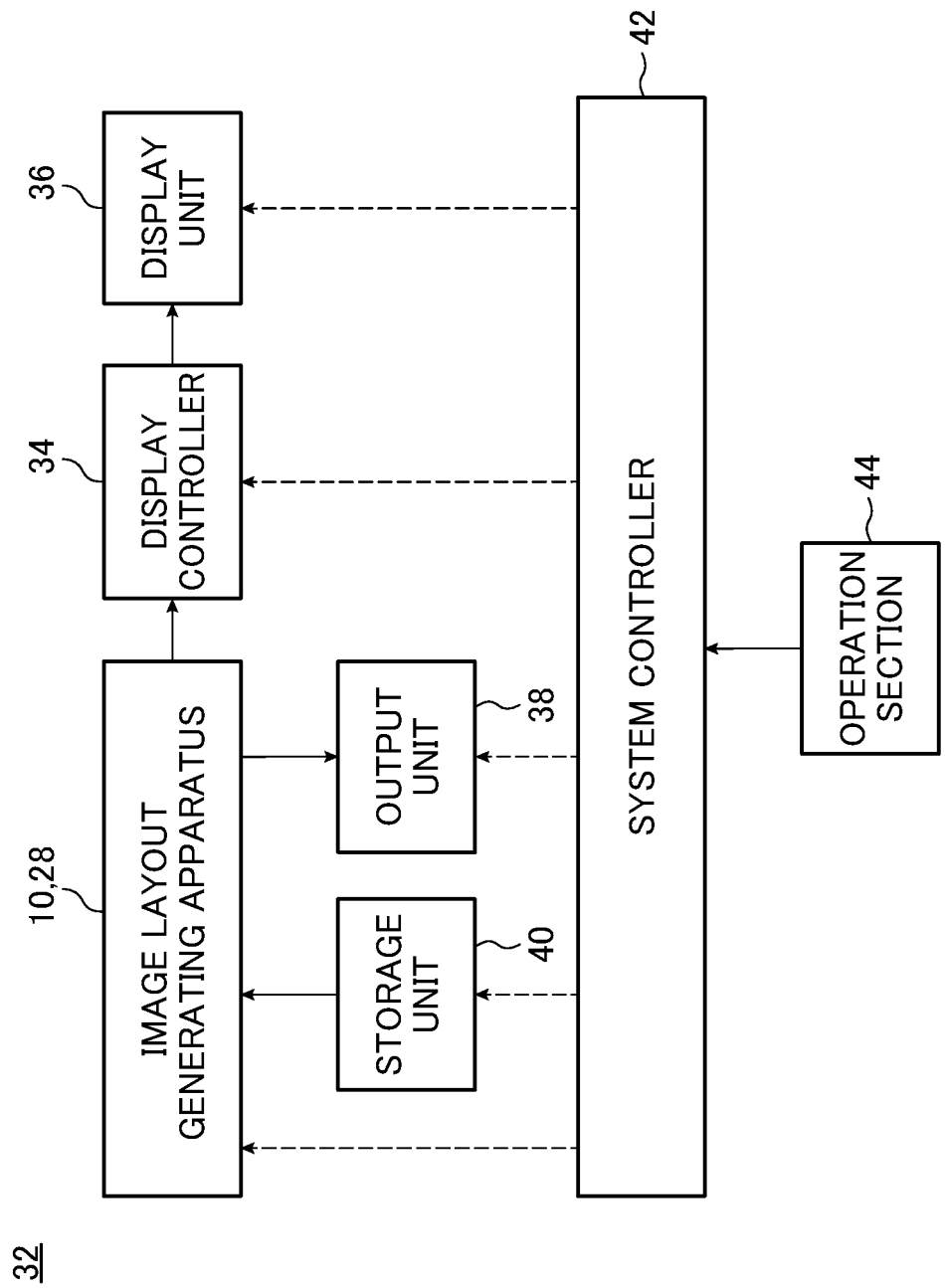
FIG. 13 is a block diagram illustrating the overall configuration of an image product creation system pertaining to a third embodiment of the invention.

An image product creation system may be configured using an image layout generating apparatus of the invention. FIG. 13 is a block diagram illustrating the overall configuration of an image product creation system 32 of the invention.

The image product creation system 32 comprises either the image layout generating apparatus 10 or 28, a display controller 34, and a display unit 36, which are connected sequentially, and an output unit 38 and a storage unit 40 that are connected to image layout generating apparatus 10 or 28, and also comprises a system controller 42 that is respectively connected to the image layout generating apparatus 10 or 28, the display controller 34, the display unit 36, the output unit 38 and the storage unit 40, and an operating section 44 that is connected to the system controller 42.

The image layout generating apparatuses 10 and 28, as described in the first and second embodiments, are for generating an image layout in which a plurality of images have been arranged in a layout area on the basis of an acquired plurality of image data.

The display controller 34 acquires data (image layout data) of an image layout that is generated in the image layout generating apparatus 10 or 28, and also acquires screen display data of a management screen such as an image layout editing screen, an image layout selecting screen from the system controller 42, and displays either an image layout or a management screen on the display unit 36.

The display unit 36 has a display screen configured to display an image and so forth, displays an image layout on the display screen on the basis of instruction of a display controller 34, and displays the aforementioned management screen on the display screen in an operable manner. Various well-known display devices, such as a liquid crystal display, can be used as the display unit 36.

The output unit 38 outputs image layout data to an outside unit as an image product. The output unit 38 is connected to a printing device such as a printer and/or a recording device, for example, and outputs image layout data to the printing device and/or the recording device. The printing device generates an image product by printing an image layout that includes a plurality of images onto a paper medium or the like, and the recording device records the image layout data onto a predetermined recording medium or the like.

The storage unit 40 is configured to store a plurality of image data acquired by the image data acquiring unit 12, a plurality of image layout data generated by the image layout generating apparatus 10 or 28, and binary tree information corresponding to the image layout data, and, for example, is configured using a recording medium, such as a hard disk drive (HDD) or a solid state drive (SSD).

The system controller 42 is connected either directly or indirectly to each part of the image product creation system 32, and on the basis of either a user instruction from the operating section 44 or a predetermined program stored in an internal memory not illustrated in the drawing, controls each part of the image product creation system 32. The editing of an image layout via the aforementioned management screen and/or the selection of an image layout to be outputted as an image product, for example, are performed via the system controller 42.

The operating section 44 receives various instructions from the user and outputs these instructions to the system controller 42, and makes use of various well-known configurations, such as a keyboard and/or a mouse, for example.

Figure 14:
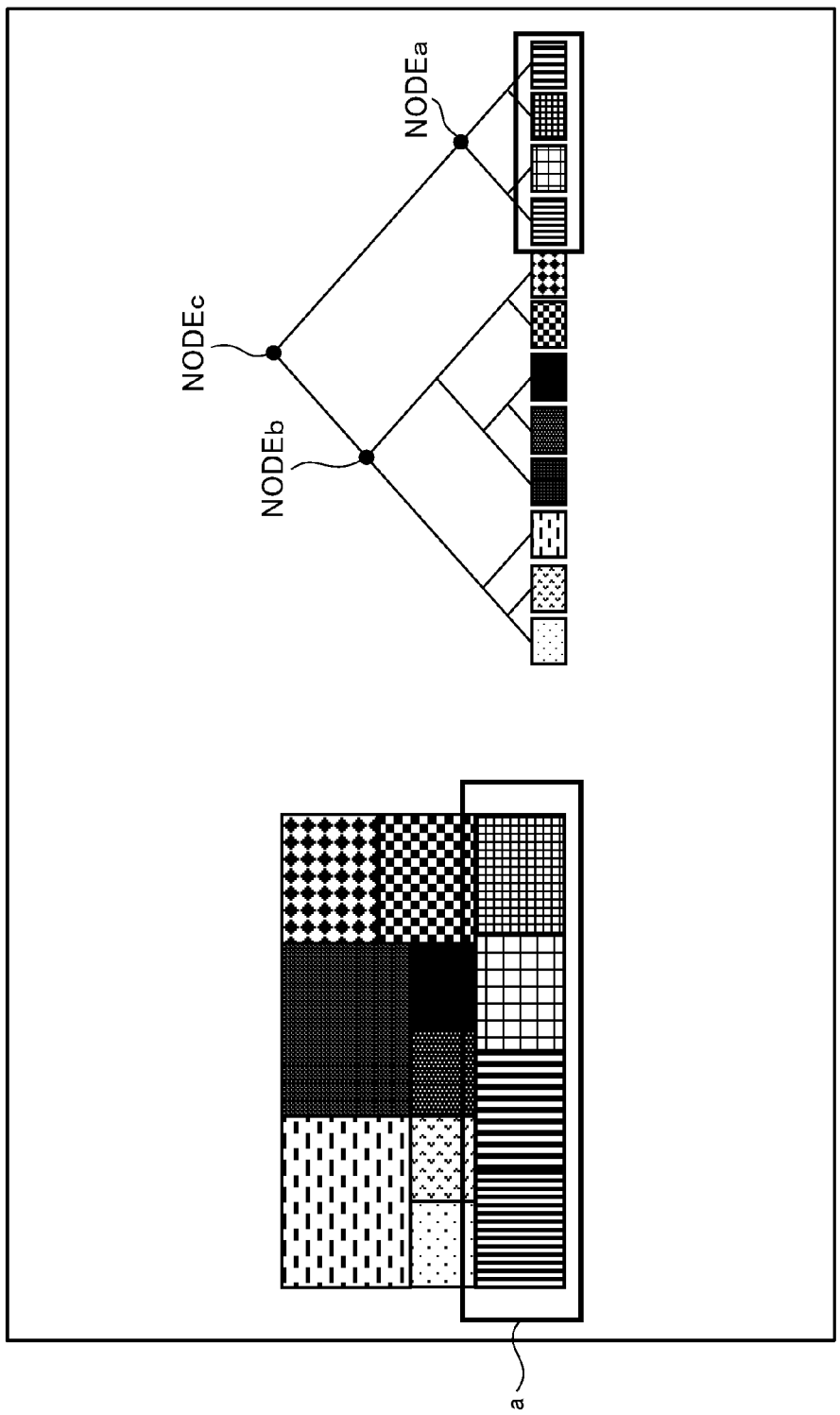
FIG. 14 is a schematic drawing illustrating an example of an image layout editing screen in which an image layout and corresponding binary tree structure are displayed juxtaposed to one another.

FIG. 14 is a schematic drawing illustrating one example of an image layout editing screen in the image product creation system 32. In the image product creation system 32, a generated image layout and a binary tree structure corresponding to the image layout can be displayed on the display unit 36, and the image layout can be edited on the basis of the binary tree structure.

The user operates the operating section 44, and edits the image layout by operating the image layout editing screen via the system controller 42. Upon the user operating the system controller 42 from the operating section 44 to select a predetermined node a of the binary tree structure displayed on the image layout editing screen, for example, the four images arranged in accordance with the node a (hereinafter, the node a images) are selected, and the four images corresponding to the node a in the image layout displayed on the same image layout editing screen are highlighted. By changing information in the node c such that the node a images are arranged below the eight images assembled by the node b (hereinafter, the node b images) so that the node a images are arranged above the node b images, for example, the user can edit the image layout so that the node a images are arranged above the node b images in the image layout as well. Similarly, the user can also delete the node a of the binary tree structure, thereby deleting the corresponding node a images from the image layout.

The image product creation system 32 may comprise a score calculator configured to calculate a score for an image layout generated by either image layout generating apparatus 10 or 28. The score calculator of the invention is configured by the above-described system controller 42.

The score calculator may calculate an image layout score (a layout score) for a generated image layout, for example, on the basis of a score for an image itself and the surface area of the image in the layout area, and may also calculate a layout score on the basis of the width of the image layout border areas (e.g. the width obtained by either adding or averaging the widths of the top and bottom borders and the widths of the left and right borders).

Upon the number of images arranged in an image layout being represented by N, the score of the ith image itself from among the N images is represented by Pi, the surface area of the images in the layout area is represented by Ai, and the width of the border areas is represented by W, for example, the layout score for an image layout can be computed using the following Formula (1).

[FORMULA 1]

$$LAYOUTSCORE = \frac{\sum_{i=1}^{N}(P_i * A_i)}{W+1} \quad (1)$$

The score for an image itself can include a score calculated by taking into account the color tone of an image, the image content, image shake or blurring, the number of face images shown in an image (number of people appearing in an image), the size of a face image, the face image expression, and so forth, and/or evaluations provided by other users via an SNS service or the like (the number of "likes" on Facebook (registered trademark), for example).

The score calculator may lower the layout score for an image layout upon the images being arranged smaller than a predetermined size.

The image product creation system 32 may arrange and display a plurality of generated image layouts side by side in layout score order on the display unit 36 on the basis of the layout scores calculated by the score calculator.

FIG. 15 is a schematic drawing illustrating an example of the image layout selecting screen. In the image product creation system 32, a plurality of generated image layouts, four types of image layouts in the example illustrated in the drawing, can be arranged and displayed side by side on the display unit 36 in layout score order, and the user may operate the operating section 44 to select one of the plurality of image layouts arranged in layout order and displayed, thereby changing the image layout to be outputted.

As described above, according to the image product creation system 32 pertaining to the third embodiment of the invention, it is possible to edit a generated image layout in a simple manner on the basis of a binary tree structure, and to select a user-desired image layout in a simple manner by displaying a plurality of generated layout images in layout score order, thereby making it possible to generate an image product that provides the user with a high sense of satisfaction.

The image layout generating apparatuses described above generate an image layout and a binary tree structure in a parallel manner, but the image layout generating apparatus may generate a binary tree structure that represents the logical structure of an image layout first, and then generate an image layout on the basis of the generated binary tree structure, for example.

The above-described image layout generating method of the invention can be processed in the respective computers by executing an image layout generating program. For example, the image layout generating program of the invention has procedures for causing a central processing unit (CPU) of a computer to perform the respective steps of the above-described image layout generating method. A program comprising these procedures may be configured as one or a plurality of program modules.

The image layout generating program comprising these computer-executed procedures may be stored in a not-illustrated internal memory of the computer, and may be stored in a recording medium, and at execution time, is read out from either the not-illustrated internal memory or the recording medium and executed by the CPU and the like.

Therefore, the invention may be a computer-readable memory or the recording medium in which the above-described image layout generating program has been stored.

The image layout generating apparatus, the image product creation system, the image layout generating method, and the image layout generating program and the recording medium of the invention have been described in detail hereinabove, but the invention is not limited to the aforementioned embodiments, and various improvements and changes may be made without departing from the scope of the invention.

What is claimed is:

1. An image layout generating apparatus, comprising:
One or more processor comprising:
an image data acquiring unit configured to acquire a plurality of image data;
a first image arranging unit configured to extract a first piece of image data from the plurality of image data, and arrange a first image in a virtual arranging area based on the first piece of image data;
an image data extracting unit configured to extract a new piece of image data to be arranged in the virtual arranging area from the plurality of image data;
an arranged image selecting unit configured to calculate an inter-image distance between the new piece of image data extracted by the image data extracting unit and image data of each arranged image that has been arranged in the virtual arranging area, and select one of the arranged images based on the calculated inter-image distance;
a second image arranging unit configured to arrange a new image based on the new image data to be above, below, left, or right of the arranged image selected by the arranged image selecting unit by adjusting a size while maintaining an aspect ratio of the new image to conform to the selected arranged image;
a size adjusting unit configured to adjust the sizes while maintaining the aspect ratios of all the arranged images so as to configure one set of images in which all of the arranged images overall form a rectangle to generate the rectangular one set of images; and
an apparatus controller configured to repeat an extraction of the new image data by the image data extracting unit, a selection of the arranged image by the arranged image selecting unit, an arrangement of the new image by the second image arranging unit, and a generation of the rectangular one set of images by the size adjusting unit until there is no longer any image data remaining to be arranged from among the plurality of image data in the virtual arranging area, and treat the rectangular one set of images that is generated last as an image layout.

2. The image layout generating apparatus according to claim 1,
wherein the image data has an image feature value, and
the arranged image selecting unit calculates the inter-image distance based on an image feature value of the new piece of image data and an image feature value of the image data of the arranged image.

3. The image layout generating apparatus according to claim 2, wherein the image feature value includes at least one of photograph date/time information, photograph location information, image color tone information, and image photograph-content information.

4. The image layout generating apparatus according to claim 2, further comprising an image feature value calculator configured to calculate an image feature value for each of the plurality of image data acquired by the image data acquiring unit.

5. The image layout generating apparatus according to claim 2,
wherein the image feature value further includes an aspect ratio value obtained by dividing a horizontal width of the image data by a vertical width thereof, and
the image data extracting unit extracts image data for which the aspect ratio value deviates from a range of 0.5 to 2.0 after extracting image data for which the aspect ratio value falls within the range of 0.5 to 2.0.

6. The image layout generating apparatus according to claim 1, wherein the apparatus controller generates a binary tree structure corresponding to the image layout in parallel with the arrangement of the first image by the first image arranging unit, the extraction of the new piece of image data by the image data extracting unit, the selection of the arranged image by the arranged image selecting unit, and the arrangement of the new image by the second image arranging unit.

7. An image product creation system, comprising:
the image layout generating apparatus according to claim 6;
a storage unit configured to store the plurality of image layouts generated by the image layout generating apparatus;
a display unit configured to display the image layout stored in the storage unit;
an image layout editor configured to edit the image layout based on user instructions; and
an output unit configured to output the image layout based on the user instructions as an image product;
wherein the display unit displays the binary tree structure together with the image layout; and
the image layout editor edits the image layout based on editing of the binary tree structure by the user.

8. The image product creation system according to claim 7, further comprising:
a score calculator configured to calculate a layout score based on the image layout,
wherein, based on the layout score calculated by the score calculator, the display unit displays the plurality of image layouts stored in the storage unit.

9. The image product creation system according to claim 8,
wherein the image layout editor allows the user to select one image layout from among the plurality of image layouts displayed on the display unit, and
the output unit outputs the image layout selected by the user as the image product.

10. An image layout generating method for generating an image layout obtained by laying out a plurality of images in a predetermined display area, comprising:
a first image arranging step for extracting a first piece of image data from a plurality of image data, and arrange a first image in a virtual arranging area based on the first piece of image data;
an image data extracting step for extracting a new piece of image data to be arranged in the virtual arranging area from the plurality of image data;
an arranged image selecting step for calculating an inter-image distance between the new piece of image data extracted in the image data extracting step and the image data of each arranged image arranged in the virtual arranging area, and selecting one of the arranged images based on the calculated inter-image distance;
a second image arranging step for arranging a new image based on the new image data to be above, below, left or right of the arranged image selected in the arranged image selecting step by adjusting the size while maintaining the aspect ratio of the new image to conform to the selected the arranged image;
a size adjusting step for generating one set of images as a rectangle by adjusting the sizes while maintaining the aspect ratios of all the arranged images so as to configure the one set of images in which all of the arranged images overall form a rectangle;
a repetition step for repeating in a sequential manner the image data extracting step, the arranged image selecting step, the second image arranging step, and the size adjusting step until there is no longer any the image data remaining to be arranged from among the plurality of image data in the virtual arranging area; and
an image layout output step for outputting, as the image layout, the rectangular one set of images generated last by repeating the repetition step.

11. The image layout generating method according to claim 10,
wherein the image data has an image feature value, and
the arranged image selecting step calculates the inter-image distance based on an image feature value of the new piece of image data and an image feature value of the image data of the arranged image.

12. The image layout generating method according to claim 11, wherein the image feature value includes at least one of photograph date/time information, photograph location information, image color tone information, and image photograph-content information.

13. The image layout generating method according to claim 11, further comprising an image feature value calculating step for calculating an image feature value for each of the plurality of image data.

14. The image layout generating method according to claim 11,
wherein the image feature value further includes an aspect ratio value obtained by dividing the horizontal width of the image data by the vertical width thereof, and
the image data extracting step extracts image data for which the aspect ratio value deviates from a range of 0.5 to 2.0 after extracting image data for which the aspect ratio value falls within the range of 0.5 to 2.0.

15. The image layout generating method according to claim 10, wherein a binary tree structure corresponding to the image layout is generated in parallel with the first image arranging step, the image data extracting step, the arranged image selecting step, and the second image arranging step.

16. A non-transitory computer-readable recording medium in which is stored an image layout generating program for causing a computer to execute each step of the image layout generating method according to claim 10.

* * * * *